A. FRANCESCATTI.
SLED PROPELLER.
APPLICATION FILED MAR. 30, 1911.
997,385.
Patented July 11, 1911.
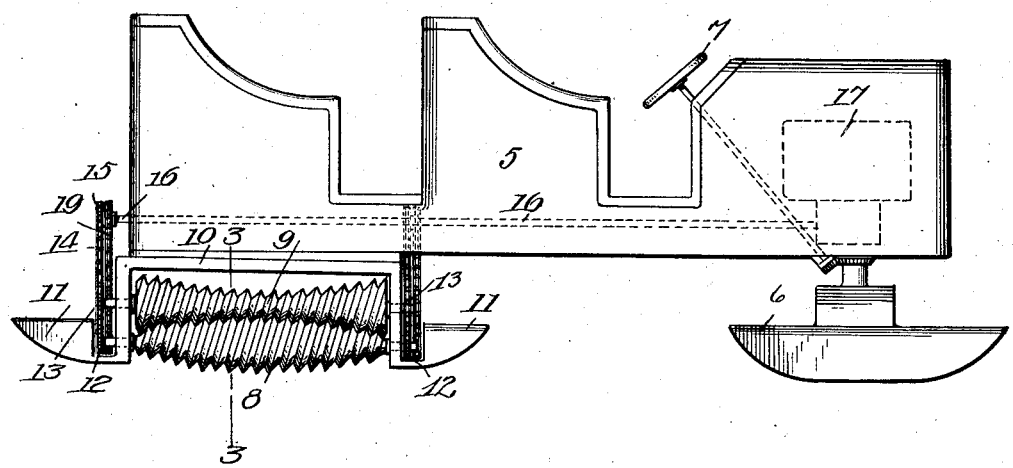
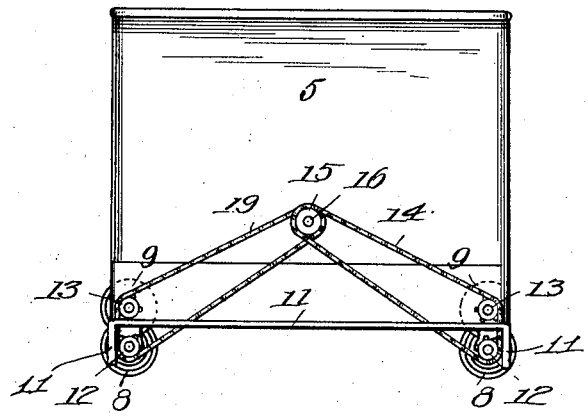
Inventor
Antonio Francescatti
By Max A. Schmidt
Attorney
Witnesses
H. C. Barry
B. N. Rollins

UNITED STATES PATENT OFFICE.

ANTONIO FRANCESCATTI, OF CEDARHURST, COLORADO.

SLED-PROPELLER.

997,385.　　　　Specification of Letters Patent.　　Patented July 11, 1911.

Application filed March 30, 1911.　Serial No. 617,889.

*To all whom it may concern:*

Be it known that I, ANTONIO FRANCESCATTI, a subject of the Emperor of Austria-Hungary, residing at Cedarhurst, in the county of Las Animas and State of Colorado, have invented certain new and useful Improvements in Sled-Propellers, of which the following is a specification.

This invention relates to sleighs which are self-propelled, the propelling means being a screw which is driven by a motor mounted on the body of the sleigh.

It is the object of the invention to provide a novel and improved propeller screw which is highly efficient in operation, and also to provide means for preventing snow and ice from sticking to the screw.

In order that the invention may be better understood reference is had to the accompanying drawing forming a part of this specification, in which drawing, Figure 1 is a side elevation of a sleigh provided with my improved propeller; Fig. 2 is a rear end view thereof, and Fig. 3 is a cross-section on the line 3—3 of Fig. 1.

Referring specifically to the drawing, the body 5 of the sleigh is mounted at its front end on runners 6 which are connected to the sleigh-body so that they may be swung sidewise for the purpose of steering the sleigh. Any suitable steering-gear may be provided. A steering-wheel is shown at 7.

The propeller is located at the rear end of the sleigh-body, one of such being located on each side. Each propelling device comprises two screws 8 and 9, respectively, located one above the other, and extending in the direction of the length of the sleigh. The bottom screw 8 is tapered toward both of its ends, and is adapted to be in contact with the surface of the snow, and when in motion propels the sleigh in an obvious manner. The top screw 9 is concaved to fit on the bottom screw 8, and the threads of the two screws are in mesh. The purpose of the top screw is to keep the threads of the bottom screw clear of snow and ice, the same being cut and scraped off by the threads of the top screw. By thus preventing the threads of the bottom screw from clogging up, a maximum propelling efficiency is maintained. The two screws 8 and 9 are carried by a frame 10 mounted beneath the sleigh-body at its rear end. At the front and rear ends of this frame are runners 11 which prevent the bottom screw from going too deep into the snow. Each screw has a shaft extension at its ends, said extensions being journaled in bearings carried by the frame 10. On the shafts of the bottom screw are sprocket wheels 12, and on the shafts of the top screw are sprocket wheels 13. Over both sets of sprocket wheels pass chains 14 which latter also pass over sprocket wheels 15 on a shaft 16 driven by the motor 17, the latter being an ordinary internal-combustion engine which is mounted on the sleigh-body. By means of this drive-gear both screws are rotated in the same direction. The screws on the other side of the sleigh are arranged and driven in the same manner as the ones already described, the drive chains 19 passing over a second set of sprocket wheels mounted on the shaft 16 beside the sprocket wheels 15.

The construction herein described provides simple and efficient propelling means for the sleigh, and the mechanism is devoid of complicated parts to get out of order.

The preferred embodiment of the invention has been shown but it will be understood that various minor changes in the structural details may be resorted to without a departure from the invention.

I claim:

1. A sleigh propeller comprising a pair of screws arranged one above the other, and having their threads in mesh, and means for rotating the screws in the same direction.

2. A sleigh propeller comprising a pair of screws arranged one above the other, and having their threads in mesh, the bottom screw being tapered toward its ends, and the top screw being correspondingly concaved to fit the bottom screw.

In testimony whereof I affix my signature in presence of two witnesses.

ANTONIO FRANCESCATTI.

Witnesses:
BENICOMINO ZENDRON,
C. VICTOR MAZZONE.

Copies of this patent may be obtained for five cents each, by addressing the "Commissioner of Patents, Washington, D. C."